(12) United States Patent
Hastie et al.

(10) Patent No.: US 9,891,917 B2
(45) Date of Patent: Feb. 13, 2018

(54) SYSTEM AND METHOD TO INCREASE LOCKSTEP CORE AVAILABILITY

(71) Applicant: Infineon Technologies AG, Neubiberg (DE)

(72) Inventors: Neil Hastie, Gloucestershire (GB); Simon Brewerton, Trowbridge (GB)

(73) Assignee: Infineon Technologies AG, Neubiberg (DE)

( * ) Notice: Subject to any disclaimer, the term of this patent is extended or adjusted under 35 U.S.C. 154(b) by 587 days.

(21) Appl. No.: 13/786,550

(22) Filed: Mar. 6, 2013

(65) Prior Publication Data
US 2014/0258684 A1    Sep. 11, 2014

(51) Int. Cl.
| G06F 15/00 | (2006.01) |
| G06F 7/38 | (2006.01) |
| G06F 9/00 | (2006.01) |
| G06F 9/44 | (2006.01) |
| G06F 9/30 | (2018.01) |
| G06F 11/16 | (2006.01) |
| G06F 11/07 | (2006.01) |

(52) U.S. Cl.
CPC ........ G06F 9/3005 (2013.01); G06F 11/0724 (2013.01); G06F 11/0793 (2013.01); G06F 11/1641 (2013.01)

(58) Field of Classification Search
None
See application file for complete search history.

(56) References Cited

U.S. PATENT DOCUMENTS

| 5,953,530 A * | 9/1999 | Rishi .................. G06F 11/3636 714/38.13 |
| 6,393,582 B1 * | 5/2002 | Klecka et al. .................. 714/11 |
| 6,625,749 B1 * | 9/2003 | Quach ............................. 714/10 |
| 7,328,371 B1 * | 2/2008 | Kalyanasundharam et al. .............................. 714/11 |
| 7,441,150 B2 | 10/2008 | Abe |
| 2001/0054057 A1 * | 12/2001 | Long ......................... G06F 9/52 718/108 |
| 2002/0077782 A1 | 6/2002 | Fruehling et al. |
| 2005/0050386 A1 * | 3/2005 | Reinhardt et al. .............. 714/13 |
| 2008/0163255 A1 * | 7/2008 | Munoz et al. ................. 719/318 |
| 2010/0131741 A1 | 5/2010 | Yamada et al. |
| 2013/0061098 A1 | 3/2013 | Shigehara |

FOREIGN PATENT DOCUMENTS

CN        101916218 A       12/2010

* cited by examiner

Primary Examiner — George Giroux
(74) Attorney, Agent, or Firm — Eschweiler & Potashnik, LLC

(57) ABSTRACT

A system and method for increasing lockstep core availability provides for writing a state of a main CPU core to a state buffer, executing one or more instructions of a task by the main CPU core to generate a first output for each executed instruction, and executing the one or more instructions of the task by a checker CPU core to generate a second output for each executed instruction. The method further includes comparing the first output with the second output, and if the first output does not match the second output, generating one or more control signals, and based upon the generation of the one or more control signals, loading the state of the main CPU core from the state buffer to the main CPU core and the checker CPU core.

18 Claims, 5 Drawing Sheets

FIG 3

SYSTEM AND METHOD TO INCREASE LOCKSTEP CORE AVAILABILITY

FIELD

Certain embodiments of the disclosure relate to providing diagnostic coverage in computational systems and methods. More specifically, certain embodiments of the disclosure relate to providing diagnostic coverage in embedded safety-relevant systems and the methods therein, while increasing lockstep CPU core availability.

BACKGROUND

Central processing units (CPUs) used in embedded safety-relevant systems commonly include a pair of CPU cores which independently and coherently run the same instruction and data sequences. The outputs of the cores are compared in real time, and if there is a mismatch which typically indicates an error, an appropriate action can then be taken to handle the error. However, by the time a state difference between the two CPU cores has been determined due to a detection of a difference between the outputs of the two CPU cores, the current internal state of either CPU core may have diverged significantly from the internal state at the time of occurrence of a CPU core-related error.

A conventional embedded safety-relevant system addresses these CPU core-related errors by placing the entire system into a reset state, then restarting the entire system. More specifically, in a conventional system a system manager logic module typically receives the core-related errors, then resets not just the pair of CPU cores, but all of the components associated with the system. However, this procedure typically takes a significant period of time during which the system is unavailable for processing of instructions and data, or I/O functions, for example. For example, the system may be unavailable for several tens of milliseconds, which is not a desirable situation for safety-relevant controllers.

Other more complex systems may use three or more CPU cores in conjunction with a majority voting system used to disable malfunctioning cores. However, although such systems may provide more CPU core availability, such availability is at the expense of additional area, power and/or cost.

It would be desirable to provide a higher percentage of CPU core availability in embedded safety-relevant systems to the task of processing data and instruction sets while still providing efficient and robust detection and correction of CPU core processing errors.

SUMMARY

According to an embodiment of the disclosure, a lockstep system comprises a main CPU core configured to receive and execute one or more instructions of a task to generate a first output for each executed instruction, a checker CPU core configured to receive and execute the one or more instructions to generate a second output for each executed instruction, a state buffer coupled to the main CPU core and the checker CPU core, and configured to store a state of the main CPU core, and a comparator coupled to the main CPU core and the checker CPU core, and configured to receive the first output and the second output for each executed instruction, compare the first output with the second output, and if the first output does not match the second output, generate one or more control signals. In one embodiment, the main CPU core and the checker CPU core are further configured to receive the one or more control signals and load a stored CPU core state from the state buffer.

According to a further embodiment of the disclosure, a method for increasing lockstep core availability comprises writing a state of a main CPU core to a state buffer, executing one or more instructions of a task by the main CPU core to generate a first output for each executed instruction, executing the one or more instructions of the task by a checker CPU core to generate a second output for each executed instruction, comparing the first output with the second output, and if the first output does not match the second output, generating one or more control signals, and based upon the generation of the one or more control signals, loading the state of the main CPU core from the state buffer to the main CPU core and the checker CPU core.

These and other advantages, aspects and novel features of the present disclosure, as well as details of an illustrated embodiment thereof, will be more fully understood from the following description and drawings.

DETAILED DESCRIPTION

Figure 1:
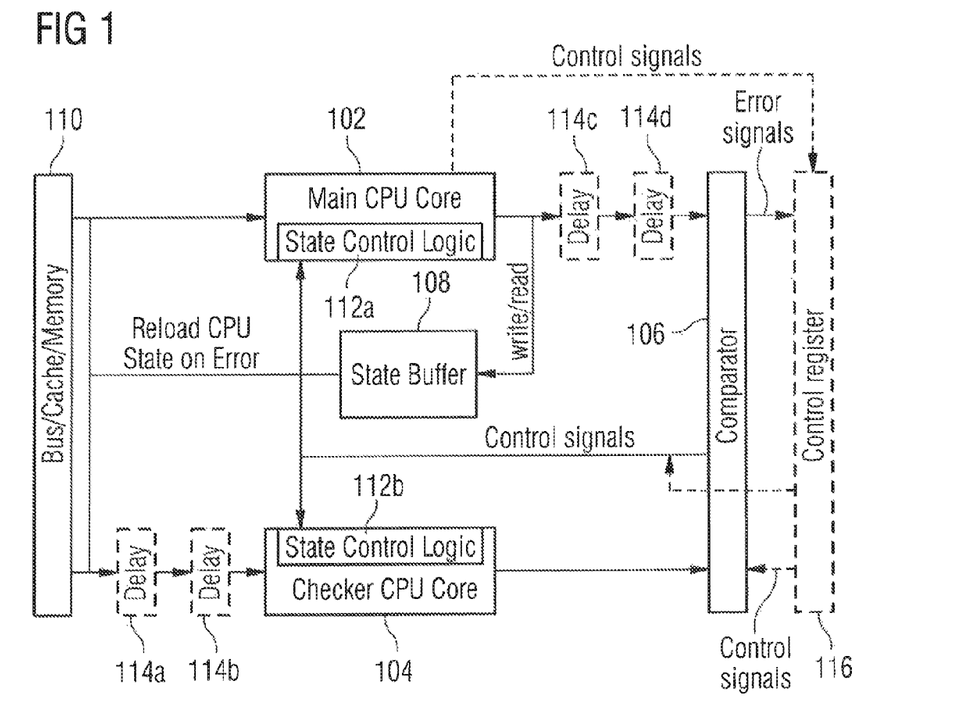
FIG. 1 is a schematic diagram of a lockstep system, according to an embodiment of the disclosure.

FIG. 1 is a schematic diagram of a lockstep system 100, according to an embodiment of the disclosure. The lockstep system includes a main CPU core 102, a checker CPU core 104, a comparator 106, a state buffer 108 and bus/cache/memory module 110. As illustrated, the main CPU core 102 includes main CPU core state control logic 112a and the checker CPU core 104 includes checker CPU core state control logic 112b. In one embodiment, the main CPU core state control logic 112a and the checker CPU core state control logic 112b comprise identical logic, enabled as either hardware, firmware or software, however, the scope of the disclosure includes non-identical implementations of state control logic 112a and 112b, to accommodate, for example, non-identical versions of the main and checker CPU cores 102 and 104, which may, for example, require state control logic 112a and 112b having different time delays. For purposes of ease of description, main CPU core state control logic 112a and checker CPU core state control logic 112b may be collectively referred to as state control logic 112.

The bus/cache/memory module 110 comprises one or more of bus lines, cache, and memory coupled to the main CPU core 102 and the checker CPU core 104, and is configured to be addressable and store data and/or programs (e.g., sequences of CPU instructions) which are accessible to the main CPU core 102 and the checker CPU core 106. The scope of the disclosure includes all types of bus lines, cache and memory. For example, a bus line may include not only electrical wires, vias or traces with multiple connections, but any type of physical arrangement that provides the same functionality.

Memory may comprise any physical memory device configured to store programs or data on a temporary or permanent basis. The scope of the disclosure includes, but is not limited to, non-volatile memory such as flash memory and ROM/PROM/EPROM/EEPROM memory, and volatile memory such as DRAM and SRAM.

The state buffer 108 may comprise any physical memory device configured to be addressable and to store a state of the main CPU core 102. In one embodiment of the disclosure, the state buffer 108 may be a dedicated memory or a portion of a pre-existing memory connected to the CPU cores 102 and 104 (either directly or via a bus system). In the later case, an address pointer may be held within the main CPU core 102 to identify the location of the state buffer 108 in memory. In such a case the pointer value may be held in a register array (not shown) specifically designed to be tolerant of soft errors. Soft errors are discussed in more detail below. In one embodiment, the register array may comprise soft error tolerant flip-flops. The soft error tolerant flip-flops may be extended to comprise the sequence logic used by, for example, the state control logic 112a of the main CPU core 102 to load a CPU state from the state buffer 108.

In one embodiment of the disclosure, the contents of the state buffer 108 are error correction code (ECC) protected. For example, the ECC may use an algorithm to calculate a code that describes the bit sequence of a unit of data that is to be stored in the state buffer 108, and the code is stored along with the unit of data in the state buffer 108. When the unit of data is requested to be read, a code for the stored and about-to-be-read unit of data (e.g., a word) is again calculated using the same algorithm. The newly generated code is compared with the code generated when the unit of data was stored, and if the codes match, the unit of data is determined to be free of errors. If the codes do not match, the missing or erroneous bits may be determined through comparison of the two codes, and the bit or bits may be then supplied or corrected.

The main CPU core 102 may comprise any type of microprocessor known to those of skill in the art that reads and execute programs. The programs may comprise CPU instructions, some of which manipulate data received from the bus/cache/memory module 110. In one embodiment, the checker CPU core 104 is identical in structure and function to the main CPU core 102, and in another embodiment, the checker CPU core 104 is identical only in function to the main CPU core 102. The main CPU core 102 and the checker CPU core 104 may collectively be referred to as lockstep CPU cores. In operation, the lockstep CPU cores may independently run (i.e., execute) the same instruction and data sequences either fully coherently (i.e., without a temporal shift between execution of an instruction(s) by the two CPU cores) or coherently (i.e., with a temporal shift).

In one embodiment of the disclosure, the lockstep system 100 includes one or more delays 114a, 114b, 114c and 114d. The delays 114a and 114b delay the input of an instruction to the checker CPU core 104, thereby producing a temporal shift between when the instruction is executed by the two CPU cores, and the delays 114c and 114d delay the output from the main CPU core 102 such that the comparator 106 may compare outputs from the two CPU cores associated with execution of the same instruction. As illustrated, the delays 114a-114d are optional features of the lockstep system 100 according to one embodiment.

In one embodiment of the disclosure, the state control logic 112a and 112b control operation of the CPU cores 102 and 104, respectively, including pausing of CPU core task execution, restarting of CPU core task execution, writing (i.e., saving) the current state of the main CPU core 102 (and in another embodiment the checker CPU core 104) to the state buffer 108, and/or reading (i.e., loading) a saved CPU core state from the state buffer 108 to the main CPU core 102 and the checker CPU core 104. For example, in one embodiment the state control logic 112a is configured to enable sampling of the state of the main CPU core 102 on a periodic basis, and writing of the sampled state (also referred to as the current state) to the state buffer 108.

In one embodiment, the state control logic 112a itself periodically samples the state of the main CPU core 102 and writes the sampled state to the state buffer 108. In another embodiment, the state control logic 112a generates control signals on a periodic basis that instructs one or more other logic units (not shown) to sample and write the sample state to the state buffer 108. In another embodiment, the state control logic 112a samples the state of the main CPU core 102 or generates control signals that instructs one or more other logic units to sample the state, based upon a trigger event. For example, a trigger event may be the start of the execution of a task, or the state of a particular flip-flop(s), or the state of one or more nodes of one or more circuit components of the system, including components of the bus/cache/memory 110, main CPU core 102 and checker CPU core 104. For the purposes of this description, a task may be defined as a particular algorithm, or alternatively defined as one software unit in one embodiment.

The comparator 106 comprises comparison logic enabled by hardware, firmware or software. The comparator 106 is configured to receive and compare the outputs from the main CPU core 102 and the checker CPU core 104. In one embodiment, if the comparator 106 determines that the outputs received from the two CPU cores differ (i.e., do not exactly match), then the comparator 106 generates one or more control signals which are communicated to the state control logic 112a of the main CPU core 102 and the state control logic 112b of the checker CPU core 104.

In one embodiment, the lockstep system 100 is embedded in a safety-relevant system, for example, in systems in which detection of soft and/or hard errors in the execution of a program or task is important for safety-relevant reasons. Soft errors may be caused, for example, by such transient events as cosmic radiation, radioactive decay or power supply variations which cause transient signals or conditions occurring in, for example, the CPU cores 102 and 104 and/or the bus/cache/memory module 110. In contrast, hard errors may result from corrupted memory cells or circuit components such as transistors due to, for example, ionizing radiation or processing (i.e., manufacturing) inconsistencies. Typically, soft errors caused by transient events have lifetimes of the order of 2 milliseconds or less, whereas a hard error is caused by an erroneous condition that is static, thereby having theoretically an infinite lifetime.

Figure 2:
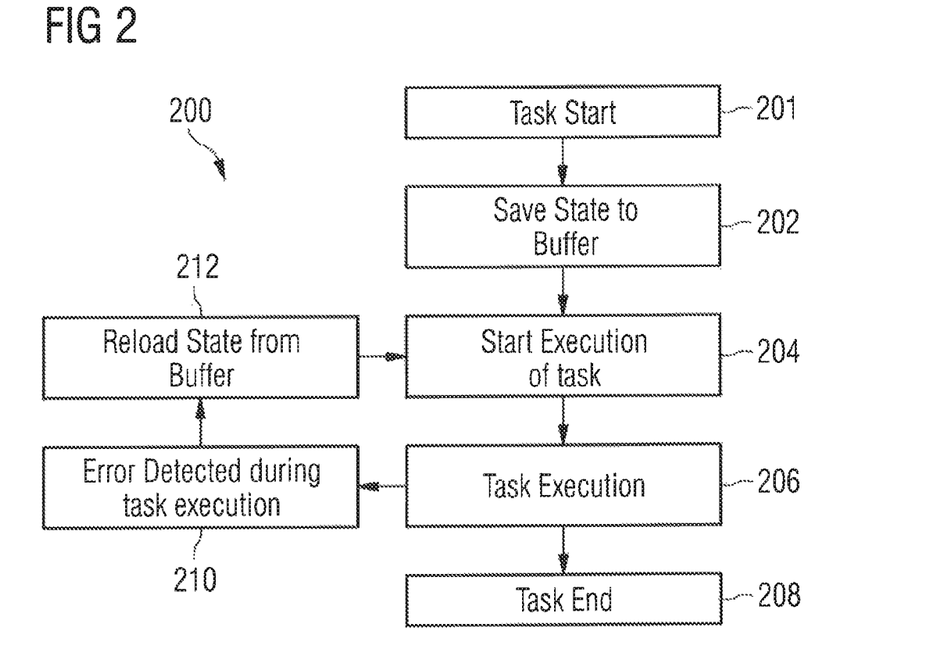
FIG. 2 is a flow diagram of method acts of increasing lockstep core availability, according to an embodiment of the disclosure.

FIG. 2 is a flow diagram illustrating a method 200 of increasing lockstep core availability, according to an embodiment of the disclosure. At 201, the task starts. In one embodiment, the task may start when execution of a previous task by the main CPU core 102 has ended, or when the main CPU core 102 receives a request to begin execution of the (new) task.

At 202, the state control logic 112a of the main CPU core 102 saves (i.e., writes) the current state of the main CPU core 102 to the state buffer 108. In one embodiment of the disclosure, for example, the state control logic 112a generates a signal(s) that cause voltage and/or current values (or digital high and low values) of various circuit components of the main CPU core 102 to be written to the state buffer 108. The values of the various circuit components may be sampled (i.e., read) directly from various nodes of the circuit components or may be read from local registers (not shown) of the main CPU core 102.

At 204, a first instruction of a set of instructions which comprise the task is received from the bus/cache/memory module 110 by the main CPU core 102 and the first instruction (delayed or not delayed) is received by the checker CPU core 104 to start execution of the task. In one embodiment of the disclosure, the task may be defined as a particular algorithm or a single software unit.

At 206, the lockstep cores (i.e., the main and the checker CPU cores 102 and 104) execute the task. The lockstep cores may independently execute the one or more instructions comprising the task either coherently or fully coherently. Furthermore, the comparator 106 compares the output (or delayed output) of the main CPU core 102 with the output of the checker CPU core 104 for each executed instruction. If the comparator 106 determines that the outputs match for each of the one or more executed instructions, the execution of the task ends at 208. In one embodiment, one or both of the lockstep cores may execute a NOP (no operation) instruction, and thus the output of the core(s) would be the same as the previous output (i.e., the state of the output does not change). For example, the main CPU core 102 and/or the checker CPU core 104 may execute one or more instructions to generate an output for each executed instruction, where one or more of the generated outputs (or consecutively generated outputs) comprise the same output state.

However, if for a particular executed instruction during the task execution, the comparator 106 detects an error at 210 (i.e., determines that the outputs do not match), then in one embodiment the comparator 106 generates one or more control signals for controlling the main CPU core state control logic 112a and/or the checker CPU core state control logic 112b. In another embodiment, the lockstep system 100 includes an optional control register 116 (FIG. 1) coupled to the comparator 106. The control register 116 is configured to receive an error signal from the comparator 106 and generate the one or more control signals for controlling the main CPU core state control logic 112a and/or the checker CPU core state control logic 112b.

Regardless of the source of the one or more control signals, at 212 the state control logic 112a and 112b receive the one or more control signals. The one or more control signals trigger the state control logic 112a and 112b to stop execution of the instructions by the main CPU core 102 and the checker CPU core 104, respectively. In one embodiment, the state control logic 112a then sends a read signal to the state buffer 108, causing the stored CPU state to be loaded into the main CPU core 102 and the checker CPU core 104. The method then continues at 204.

In summary, a known good state of the main CPU core 102 (i.e., an error-free state) is written to the state buffer 108 before start of execution of a task. If a lockstep error is detected during the execution of the task, the task execution is halted and the known good state is then loaded to both of the CPU cores 102 and 104, essentially reinitializing the core states. In other words, the core states are "wound back" to the state of the main CPU core which was known at the start of the task, and the sequence of instructions are re-executed. By only re-winding the main CPU core 102 (and its associated checker CPU core 104) when a processing error is detected (via analyzing the outputs of the main CPU core 102 and its associated checker CPU core 104), a reset of an entire processing system (i.e., a processing system comprising more than a single main CPU core, for example) is avoided, thereby increasing the percentage of time available for the main CPU core 102 (or CPU cores) to process tasks. Thus, the percentage of total time available for computational operations dedicated to executing instruction sets is increased, even when computing verifiably correct results in the presence of highly individualized CPU core state corruption.

If CPU core state corruption is due to a single event upset during execution of a task (i.e., the occurrence of a soft error having a lifetime of less than approximately 2 ms), then the CPU output resulting from the loading (also referred to as reloading) of the known good CPU state and the repeated execution of the task will be error-free, assuming that another single soft-error event does not occur, and the lockstep cores can continue in locked operation as the core states will remain coherent (or fully coherent).

However, if the error is due to any other failure (e.g., an occurrence of a hard error), then reloading the known good CPU state and repeating execution of the task will not result in an error-free CPU output. Thus, to prevent the lockstep cores 102 and 104 from entering an endless loop, the lockstep system 100 may optionally include a counter or state machine (not shown) which is configured to limit the number of successive CPU state reloads when performing the same operational sequence (i.e., the same set of instructions comprising a particular task, for example).

Figure 3:
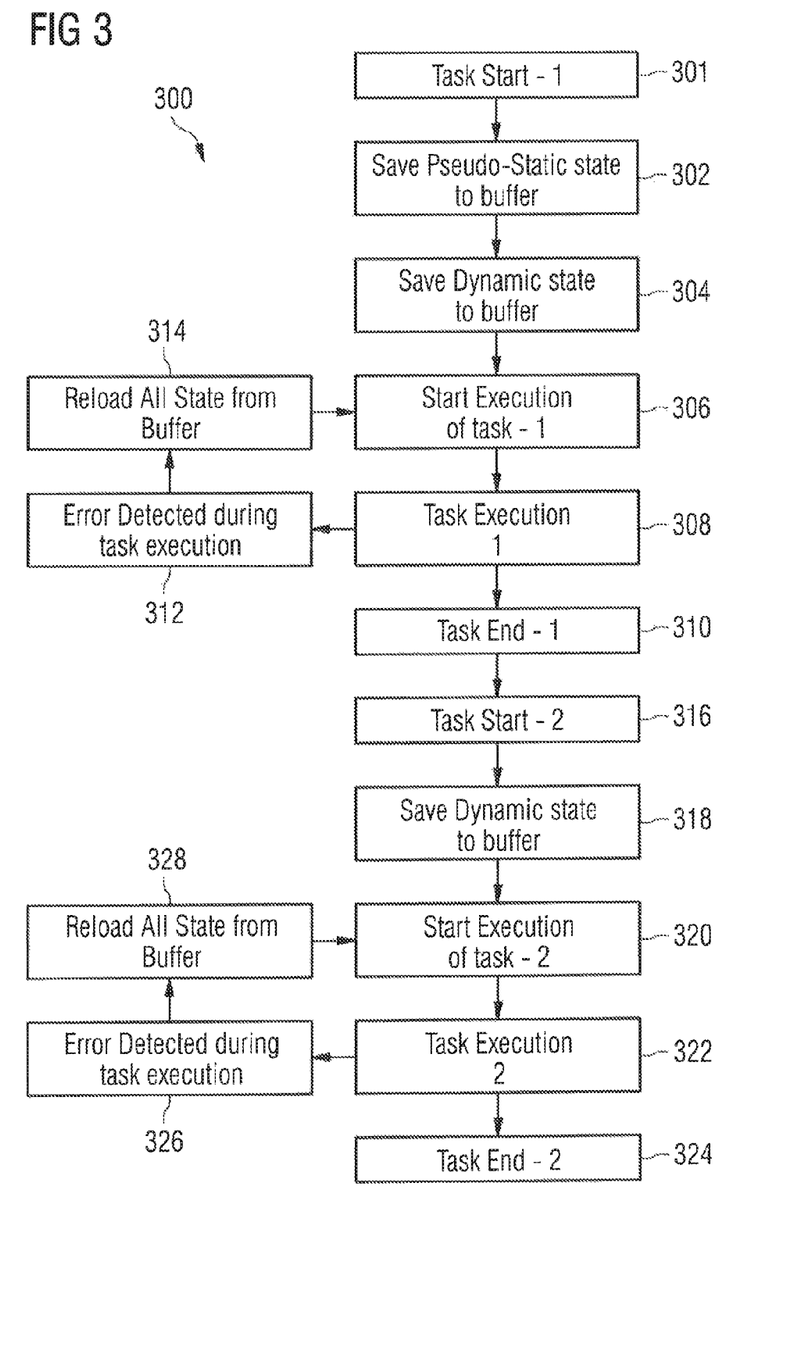
FIG. 3 is a flow diagram of method acts of increasing lockstep core availability, according to another embodiment of the disclosure.

FIG. 3 is a flow diagram illustrating a method 300 of increasing lockstep core availability, according to another embodiment of the disclosure. Typically, states within a CPU core may be classified as either dynamic or pseudo-static, where a dynamic state is a state that changes within a task, whereas a pseudo-static state is a state that remains constant during execution of a task, or may remain constant from task to task (i.e., remain constant during execution of one or more tasks). The state of a CPU core may comprise both types of states at the same time. In order to reduce the time taken to save CPU states to the state buffer 108 at the start of a task, the pseudo-static state component of the CPU state is written to the state buffer 108 only when it has changed. In contrast, the dynamic state component of the CPU state is written to the state buffer 108 at the start of each task. In one embodiment, when the comparator 106 detects an error, both the pseudo-static and dynamic states are reloaded into the lockstep cores 102 and 104.

As illustrated in FIG. 3 at 301, a first task starts. In one embodiment, the first task may start when execution of a previous task has ended, or when the main CPU core 102 receives a request to begin execution of the first task.

At 302, assuming that the pseudo-static state of the main CPU core 102 associated with the first task (also referred to as a current pseudo-static state) is different from the pseudo-static state of the main CPU core 102 associated with a previous task, the state control logic 112a of the main CPU core 102 saves the current pseudo-static state of the main CPU core 102 to the state buffer 108.

At 304, the state control logic 112a of the main CPU core 102 saves the dynamic state of the main CPU core 102 associated with the first task (also referred to as a current dynamic state) to the state buffer 108.

At 306, a first instruction of a set of instructions which comprise the first task is received from the bus/cache/memory module 110 by the main CPU core 102 and the first instruction (delayed or not delayed) is received by the checker CPU core 104 to start execution of the first task.

At 308, the lockstep cores execute the first task. Acts 308-314 are the same as acts 206-212 of FIG. 2, with the exception that upon occurrence of an error as detected by the comparator 106, the state control logic 112*a* sends a read signal to the state buffer 108 causing both the stored pseudo-static CPU state and the stored dynamic CPU state to be loaded into the main CPU core 102 and the checker CPU core 104.

At 316, a second task starts. The second task may start when execution of the first task has ended, or when the main CPU core 102 receives a request to begin execution of the second task.

At 318, the state control logic 112*a* of the main CPU core 102 saves the dynamic state of the main CPU core 102 associated with the second task to the state buffer 108. In this example embodiment, it is assumed that the pseudo-static state associated with the second task is the same as the pseudo-static state associated with the first task, thus the state control logic 112*a* of the main CPU core 102 does not save the pseudo-static state of the main CPU core 102 associated with the second task to the state buffer 108. The method continues at 320. Acts 320-328 with regard to the second task are the same as acts 306-314 with regard to the first task.

Figure 4:
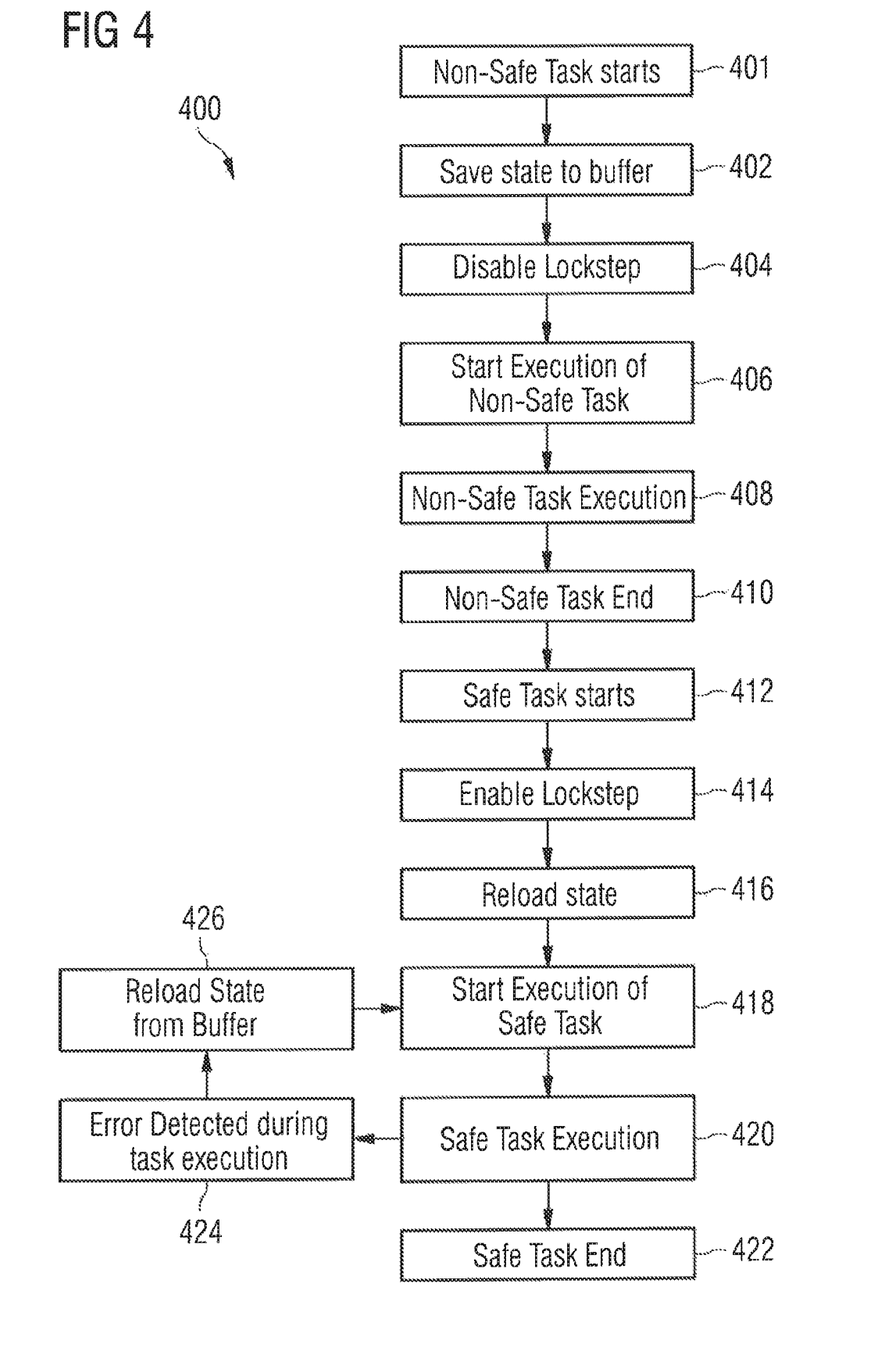
FIG. 4 is a flow diagram of method acts of increasing lockstep core availability, according to another embodiment of the disclosure.

FIG. 4 is a flow diagram illustrating a method 400 of increasing lockstep core availability, according to another embodiment of the disclosure. Many applications contain both safe and non-safe tasks. Non-safe tasks are tasks in which errors in the output of a CPU core may be tolerated. In order to save power, and increase the overall availability of the main CPU core 102 in processing instructions by reducing the amount of overall time spent in storing and reloading CPU core states, the checker CPU core 104, comparator 106, and the control register 116 (when present) may be disabled when running (i.e., executing) non-safe tasks, according to an embodiment of the disclosure. However, disabling the comparator 106 and the checker CPU core 104 require that an incoherent checker CPU core 104 be brought back into lockstep with the main CPU core 102 when a safe task is to be executed later.

The systems and methods described above in conjunction with FIGS. 1-3 enable lockstep CPU cores to be restarted from a known good CPU core state following detection of an error in either of the CPU cores. As will be described below in relation to FIG. 4, these same systems and methods can also be used to re-synchronize and restart a lockstep system that has been previously disabled.

As illustrated in FIG. 4 at 401, a non-safe task starts. In one embodiment, the non-safe task may start when execution of a previous task has ended, or when the main CPU core 102 receives a request to begin execution of the non-safe task.

At 402, the state control logic 112*a* of the main CPU core 102 saves the current state of the main CPU core 102 to the state buffer 108.

At 404, based upon recognizing that the current task is a non-safe task, the state control logic 112*a* of the main CPU core 102 sends disable control signals to the comparator 106 and the state control logic 112*b* of the checker CPU core 104. The preprogrammed logic of the comparator 106 and the state control logic 112*b* may utilize the disable control signals to turn off transistors, switches, power supplies and/or other circuit components of the comparator 106 and the checker CPU core 104, respectively, for example. In another embodiment, the main CPU core 102 sends control signals signifying that the current task is a non-safe task (i.e., non-safe task control signals) to the control register 116, and in response, the control register 116 generates disable control signals, and sends the disable control signals to the comparator 106 and the state control logic 112*b* of the checker CPU core 104.

At 406, the non-safe task is started by receiving, by the main CPU core 102, a first instruction of a set of instructions which comprise the non-safe task from the bus/cache/memory module 110. At 408, the main CPU core 102 executes the non-safe task. At 410, execution of the non-safe task ends.

At 412, a safe task starts. The safe task may be started when the main CPU core 102 receives a request to begin execution of the safe task.

At 414, based upon recognizing that the start of a new task is a safe task, the state control logic 112*a* of the main CPU core 102 sends enable control signals to the comparator 106 and the state control logic 112*b* of the checker CPU core 104. The preprogrammed logic of the comparator 106 and the state control logic 112*b* may utilize the enable control signals to enable the lockstep operation by turning on the transistors, switches, power supplies and/or other circuit components of the comparator 106 and the checker CPU core 104, respectively, which had been previously turned off at 404. In another embodiment, the main CPU core 102 sends control signals signifying that the current task is a safe task (i.e., safe task control signals) to the control register 116, and in response, the control register 116 generates enable control signals, and sends the enable control signals to the comparator 106 and the state control logic 112*b* of the checker CPU core 104.

At 416, the state control logic 112*a* of the main CPU core 102 sends a read signal to the state buffer 108, based upon recognizing that the start of a new task is a safe task, causing the stored CPU state to be loaded into the main CPU core 102 and the checker CPU core 104. The method continues at 418. With regard to execution of the safe task, acts 418-426 are identical to acts 204-212 illustrated in FIG. 2.

Many systems use an operating system to dispatch tasks to specific core instances (i.e., specific CPU cores). As previously discussed above, embodiments of the present disclosure include reloading all or a sub-set of a stored main CPU core state upon occurrence of a triggering event, such as a lockstep error.

Another embodiment of the disclosure provides for switching of the complete context of a CPU core. The context of a particular CPU core may include more than the current task-based CPU core state, and may include, for example, one or more of a program counter state, a register file state, a memory protection system state and a time protection system state, where the program counter, the register file, the memory protection system and the time protection system are all associated with operation of the particular CPU core. In this regard, the complete context of a CPU core may also be referred to as a machine context.

In one embodiment, a trigger for a CPU core complete context switch (i.e., a switching of the machine context) may be an operating system event, and a new CPU core complete context (i.e., a new machine context) may be loaded by the lockstep system 100 to set (i.e., initialize) not only the main CPU core state (and checker CPU core state) associated with executing a particular task, but the states of all of the devices and/or systems associated with operation of the main CPU core 102. The scope of the disclosure, however, includes using any event as a trigger, such as, by way of example, a trigger based upon the collective states of a plurality of main CPU cores (being run in parallel and executing either the same task applied to different data or different tasks of the same program, for example) having one or more predetermined values, or values greater than one or more predetermined (or programmable) thresholds.

Thus, implementation of a system or method for switching machine context based upon a triggering event may increase lockstep core availability by avoiding the conventional implementation of a full operating system task dispatch loop. In contrast to the conventional implementation, one task may chain another task by saving machine context states and providing for machine context state reloads. This procedure effectively makes each stored machine context state capable of being an independent software thread, with a time based round robin (or any other feasible) scheduler configured to periodically (or a-periodically based on events) save one machine context state (i.e., thread) and load another new (or partially completed) thread.

Figure 5:
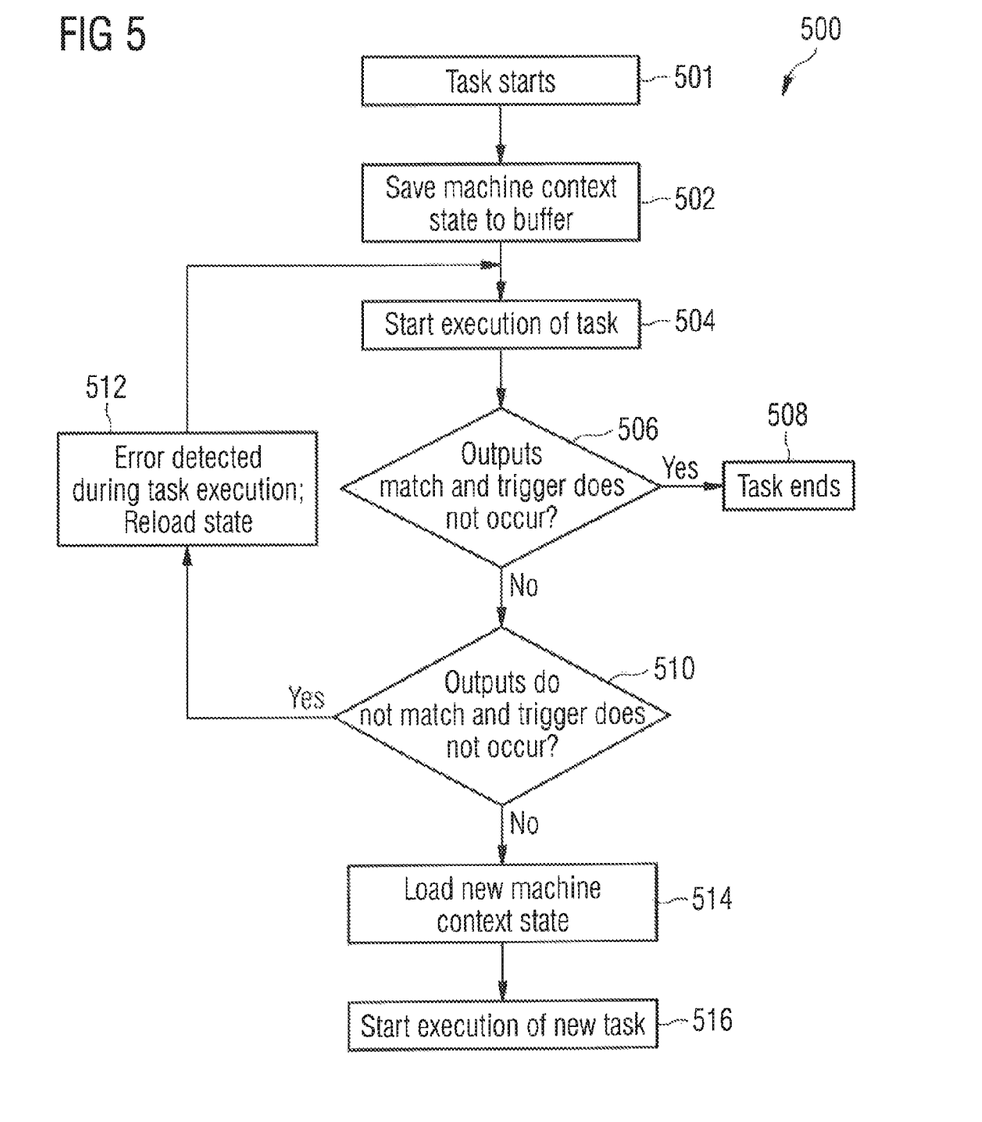
FIG. 5 is a flow diagram of method acts of increasing lockstep core availability, according to another embodiment of the disclosure.

FIG. 5 is a flow diagram illustrating a method 500 of increasing lockstep core availability, according to another embodiment of the disclosure. Acts 501, 502 and 504 are identical to acts 201, 202 and 204 illustrated in FIG. 2, with the exception that act 502 saves a machine context state (instead of only a CPU state) to the state buffer 108.

If at 506 the comparator 106 determines, during execution of the task, that the outputs of the main CPU core 102 and checker CPU core 104 match for each of the one or more executed instructions of a task, and if a triggering event for switching the machine context state associated with the main CPU core 102 executing the task does not occur, then the task and the method ends at 508, otherwise the method continues at 510.

At 510, if the comparator 106 determines that the outputs of the main CPU core 102 and checker CPU core 104 do not match for an executed instruction before an occurrence of a machine context state triggering event, then the method continues at 512, otherwise, the method continues at 514. Act 512 is similar to acts 210 and 212 illustrated in FIG. 2. At 512, the comparator 106 generates control signals and the state control logic 112a utilizes the control signals to cause the stored CPU state (as a component of the stored machine context state) to be loaded into the main CPU core 102 and the checker CPU core 104, and the method continues at 504.

At 514, a machine context state triggering event has necessarily occurred before an occurrence of a mismatch in the comparison of the outputs of the main CPU core 102 and checker CPU core 104. Thus, at 514, the machine content state triggering event causes the state control logic 112a and 112b to stop execution of the instructions of the current task by the main CPU core 102 and the checker CPU core 104, respectively. The state control logic 112a then writes a new machine context state associated with a new task from a second state buffer (not shown) to the state buffer 108, then loads the new machine context state from the state buffer 108 to the lockstep CPU cores 102 and 104 and one or more of the devices and/or systems associated with operation of the main CPU core 102. The second state buffer may or may not be associated with a second main core CPU (not shown). At 516, the lockstep cores 102 and 104 begin execution of the new task associated with the new machine context state.

Since a computational system in which one or more lockstep systems 100 are embedded may have more than one CPU core, including main and secondary CPU cores, for example, embodiments of the present disclosure as illustrated above provide for reloading a saved CPU state associated with a first CPU core of first lockstep CPU cores, when an error is detected in the comparison of the outputs from the first lockstep CPU cores in executing instructions of a task, to a second CPU core which then executes the instructions of the task. In this embodiment, the lockstep system 100 enables the transfer of tasks and the dynamically reloading of CPU core states from core to core. The ability to transfer tasks provides for removing tasks from incorrectly operating CPU cores, sharing CPU loads between cores dynamically, running one task several times on a core (e.g., to detect single event upsets), and removing tasks from one or more cores in a cluster of cores to save power by shutting down or reducing the performance of one or more of the cores in the cluster.

While the present disclosure has been described with reference to certain embodiments, it will be understood by those skilled in the art that various changes may be made and equivalents may be substituted without departing from the scope of the present disclosure. For example, although in one embodiment the main CPU core state control logic is configured to write the state of the main CPU core to the state buffer based upon an occurrence of a trigger event during execution of the one or more instructions by the main CPU core, the scope of the present disclosure includes an embodiment in which the checker CPU core state control logic is configured to write the state of either the checker CPU core or the main CPU core to the state buffer based upon an occurrence of a trigger event during execution of the one or more instructions by the checker CPU core, and an embodiment in which both the main CPU core state control logic and the checker CPU core state control logic are configured to write the state of the main CPU core (or the state of its respective cores) to the state buffer based upon an occurrence of a trigger event during execution of the one or more instructions by the either the checker CPU core or the main CPU core.

In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A lockstep system, comprising:
a main CPU core configured to receive and execute a task;
a state control logic configured to store a state of the main CPU core in a state buffer when detecting that the task is a non-safe task, and to load the stored state from the state buffer into the main CPU core and a checker CPU core when detecting that a subsequent task is a safe task;
the main CPU core further configured to receive and execute the subsequent task to generate a first output;
the checker CPU core configured to receive the subsequent task and execute the subsequent task to generate a second output;
a comparator coupled to the main CPU core and the checker CPU core, the comparator configured to compare the first output with the second output, and if the first output does not match the second output conclude that an error has been detected and generate one or more control signals in response thereto.

2. The lockstep system according to claim 1, further comprising a bus/cache/memory module coupled to the main CPU core and the checker CPU core, wherein the main CPU core and the checker CPU core are further configured to receive the task from the bus/cache/memory module.

3. The lockstep system according to claim 2, further comprising one or more first delays coupled in series between the bus/cache/memory module and the checker CPU core, and one or more second delays coupled in series between the main CPU core and the comparator.

4. The lockstep system according to claim 1, wherein the state control logic is configured to write the state of the main CPU core to the state buffer before execution of the one or more instructions by the main CPU core.

5. The lockstep system according to claim 1, wherein the state control logic is configured to write the state of the main CPU core to the state buffer based upon an occurrence of a trigger event during execution of the one or more instructions by the main CPU core.

6. The lockstep system according to claim 1, wherein the state control logic includes a main CPU core state control logic configured to stop execution of the one or more instructions by the main CPU core upon receiving the one or more control signals and a checker CPU core state control logic configured to stop execution of the one or more instructions by the checker CPU core upon receiving the one or more control signals.

7. The lockstep system according to claim 6, wherein the main CPU core state control logic is further configured to generate a read signal, based upon receiving the one or more control signals, for loading the stored CPU core state to the main CPU core and the checker CPU core from the state buffer.

8. The lockstep system according to claim 1, wherein the main CPU core and the checker CPU core execute the one or more instructions coherently.

9. A method for increasing lockstep core availability, comprising:
   executing one or more instructions of a task by a main CPU core;
   storing a state of the main CPU core in a state buffer when detecting that the task is a non-safe task;
   loading the stored state from the state buffer into the main CPU core and a checker CPU core when detecting that a subsequent task is a safe task;
   executing one or more instructions of the subsequent task by the main CPU core to generate a first output for each executed instruction;
   executing the one or more instructions of the subsequent task by the checker CPU core to generate a second output for each executed instruction;
   comparing, by a comparator, the first output with the second output, and if the first output does not match the second output, generating one or more control signal.

10. The method for increasing lockstep core availability according to claim 9, further comprising receiving the one or more instructions by the main CPU core and the checker CPU core from a bus/cache/memory module.

11. The method for increasing lockstep core availability according to claim 10, further comprising delaying the one or more instructions received by the checker CPU core and delaying the first output of the main CPU core.

12. The method for increasing lockstep core availability according to claim 9, wherein the state of the main CPU core comprises a pseudo-static state and a dynamic state, and wherein writing the state of the main CPU core to the state buffer further comprises:
   whether or not the state of the main CPU core has changed, writing the dynamic state to the state buffer before executing the one or more instructions of the task by the main CPU core; and
   writing the pseudo-static state to the state buffer only if a pseudo-static state of the main CPU core has changed.

13. The method for increasing lockstep core availability according to claim 9, further comprising writing the state of the main CPU core to the state buffer based upon an occurrence of a trigger event during execution of the one or more instructions by the main CPU core.

14. The method for increasing lockstep core availability according to claim 9, further comprising stopping execution of the one or more instructions by the main CPU core and the one or more instructions by the checker CPU core based upon receiving, by the main CPU core, the one or more control signals.

15. The method for increasing lockstep core availability according to claim 14, further comprising generating a read signal, based upon receiving by the main CPU core the one or more control signals, for loading the most recent error-free state of the main CPU core from the state buffer to the main CPU core and the checker CPU core.

16. The method for increasing lockstep core availability according to claim 9, wherein the main CPU core and the checker CPU core execute the one or more instructions coherently.

17. The method for increasing lockstep core availability according to claim 9, wherein executing the one or more instructions of the subsequent task by the main CPU core, executing the one or more instructions of the subsequent task by the checker CPU core and comparing are repeated until either the first output for each executed instruction matches the second output for each executed instruction or a predetermined time period has lapsed, or the acts of executing and comparing are repeated a predetermined number of times.

18. The method for increasing lockstep core availability according to claim 9, further comprising:
   disabling the checker CPU core and the comparator when the non-safe task is detected;
   executing the non-safe task by the main CPU core; and
   enabling the checker CPU core and the comparator when the subsequent safe task is detected, prior to loading the stored state from the state buffer to the main CPU core and the checker CPU core.

* * * * *